United States Patent
Maenpaa

(10) Patent No.: US 10,043,171 B2
(45) Date of Patent: Aug. 7, 2018

(54) SYSTEM AND METHOD FOR PERFORMING AUTOMATIC PAYMENT TRANSACTIONS

(71) Applicant: MasterCard International Incorporated, Purchase, NY (US)

(72) Inventor: Pia K. Maenpaa, White Plains, NY (US)

(73) Assignee: MASTERCARD INTERNATIONAL INCORPORATED, Purchase, NY (US)

( * ) Notice: Subject to any disclaimer, the term of this patent is extended or adjusted under 35 U.S.C. 154(b) by 480 days.

(21) Appl. No.: 14/566,236

(22) Filed: Dec. 10, 2014

(65) Prior Publication Data

US 2016/0171502 A1   Jun. 16, 2016

(51) Int. Cl.
  *G06Q 20/32*   (2012.01)
  *G06Q 20/40*   (2012.01)

(52) U.S. Cl.
  CPC .......... *G06Q 20/32* (2013.01); *G06Q 20/327* (2013.01); *G06Q 20/3224* (2013.01); *G06Q 20/4014* (2013.01)

(58) Field of Classification Search
  CPC ...... G02Q 20/18; G02Q 20/32; G02Q 20/322; G02Q 20/327; G02Q 20/3278; G02Q 20/401
  See application file for complete search history.

(56) References Cited

U.S. PATENT DOCUMENTS

| | | | | |
|---|---|---|---|---|
| 5,310,999 A | * | 5/1994 | Claus | G01S 13/751 235/384 |
| 7,735,733 B2 | * | 6/2010 | Kranzley | G06Q 20/105 235/439 |
| 7,930,249 B2 | * | 4/2011 | Roberts | G06Q 20/10 705/41 |
| 2014/0101036 A1 | * | 4/2014 | Phillips | G06Q 20/027 705/39 |

* cited by examiner

*Primary Examiner* — Scott S Trotter
(74) *Attorney, Agent, or Firm* — Budzyn IP Law, LLC

(57) ABSTRACT

A method and system of conducting a payment transaction including receiving, by a payment platform, a verification query including payment profile identification information and a payment request. The payment request includes merchant information. The payment profile identification information is obtained from a payment device using wireless communication. The payment device is associated with a payer, and the payment transaction is initiated in response to the presence of the payment device in a predetermined payment charging area. Comparing, using the payment platform, the payment profile identification information and the merchant information with stored verification parameters to determine if the payment profile identification information is properly associated with the merchant information. Verifying, using the payment platform, the payment transaction in response to the payment profile identification information being properly associated with the merchant information.

26 Claims, 5 Drawing Sheets

SYSTEM AND METHOD FOR PERFORMING AUTOMATIC PAYMENT TRANSACTIONS

FIELD OF THE DISCLOSURE

The present disclosure relates to performing payment transaction and more particularly, to facilitating payment transactions by automating the payment process without requiring a dedicated payment action by the purchaser during the payment process.

BACKGROUND OF THE DISCLOSURE

The use of payment devices for a broad spectrum of cashless transactions has become ubiquitous in the current economy, according to some estimates accounting for hundreds of billions or even trillions of dollars in transaction volume annually.

Cashless digital payment transactions typically involve a purchaser presenting a payment device such as a payment card, e.g., credit or debit card, at the point of sale. A payment device can also include the use of cell phones, payment fobs, tags, chips, or other devices which may have wireless communication capabilities that connect with point of sale devices. Payments made by such devices are processed though a payment network that ensures that the payment amount is applied to the purchaser and that the merchant is paid. In order to conduct these payment transactions, a purchaser needs to interact with a point of sale device and present the payment device so that the transaction can be completed. Even when wireless payment technology is being employed, the purchaser still must interact with a point of sale location to make the payment by presenting the payment device. This can be problematic when there are a number of purchasers waiting to make payment. Delays required in making a payment can discourage purchasers from buying products. On the other hand, adding checkout lines to reduce delays can increase expenses for merchants.

Many payment transactions are based on a purchaser's presence in a physical location. For example, entering a parking area will typically incur a certain charge based on time. Presence in fitness location, museum, or amusement park can also be charged based on the user being present in a location. In order to pay for use of these facilities, a user is required to make a dedicated payment action such as stopping at a point of payment location. At this location a user may present cash or use a payment device, such as a credit or debit card. This process can be time consuming and inefficient both for the merchant and the consumer whether it is a one-time payment or a frequently reoccurring.

Accordingly, it would be desirable for a payment system that permits a payment transaction to be completed without the need for a dedicated payment action by the consumer.

SUMMARY OF THE DISCLOSURE

The present disclosure provides a method of conducting a payment transaction including receiving, by a payment platform, a verification query including payment profile identification information and a payment request, the payment request including merchant information, the payment profile identification information being obtained from a payment device using wireless communication, the payment device being associated with a payer, the payment transaction being initiated in response to the presence of the payment device in a predetermined payment charging area; comparing, using the payment platform, the payment profile identification information and the merchant information with stored verification parameters to determine if the payment profile identification information is properly associated with the merchant information; and verifying, using the payment platform, the payment transaction in response to the payment profile identification information being properly associated with the merchant information.

The present disclosure further provides a payment authorization system including a first payment profile and a second payment profile, each of the first and second profiles containing information being specific to a payer, the first payment profile containing information different from the second payment profile, the first payment profile being related to a first payment activity, the second payment profile being related to a second payment activity, the first and second payment profiles being related to identification information carried by a payment device adapted to wirelessly communicate with a scanning device; a payment platform operably connectable to the scanning device, the payment platform receiving at least one of the first and second payment profiles, the payment platform comparing the payment profile identification information and the merchant information with stored verification parameters to determine if the payment profile identification information is properly associated with the merchant information; and verifying, using the payment platform system, the payment transaction in response to the payment profile identification information being properly associated with the merchant information.

The present disclosure still further provides a payment transaction system including a payment platform including a processing device and receiving a verification query including payment profile identification information and a payment request, the payment request including merchant information, the payment profile identification information being obtained from a payment device using wireless communication, the payment device being associated with a payer, the payment transaction being initiated in response to the presence of the payment device in a predetermined payment charging area. The payment platform compares the payment profile identification information and the merchant information with stored verification parameters to determine if the payment profile identification information is properly associated with the merchant information. The payment platform verifies the payment transaction in response to the payment profile identification information being properly associated with the merchant information.

DETAILED DESCRIPTION OF THE PREFERRED EMBODIMENTS

The payment system processes charges automatically when a consumer, or payer, having a payment profile is detected entering, existing in or leaving a payment charging area operated by a merchant, or payee. This allows the consumers to utilize and pay for many services conveniently without having to make a dedicated stop and pay action. A payment platform verifies the purchasers profile and communicates with the merchant's payment system to allow charges to be applied.

The automatic payment system is particularly applicable where the charge is determined by time, usage or other automatically measurable method. For example, such situations may include transit purchases where customers can be charged by the location and time they use the train, taxi or bus, road tolls. In addition, gyms, fitness and yoga studios and similar where consumers could be charged when present, and buffet restaurants, school cafeterias and similar where the charge is fixed or easily selected by the user. Further purchase events may include an entrance fees and parking garages, movie theaters, sports arenas, flea markets, county fairs, music festivals, museums, national parks, ski areas, swimming pools, botanical gardens, amusement parks, conferences, and lectures. The system is also particularly applicable to locations where the charge is easily matched with the chargeable payment profile, e.g., auto repair shops, gas stations, TV and internet streaming services, printers, self-service checkouts, and locations where service provider visits can be charged, e.g., houses (for deliveries, repairs), businesses. The present payment system would also be convenient for micro payments (<$1), e.g., as facility fees or congested locations where large volumes of micro payments could be used for upkeep and maintenance and micro payments could also be voluntary by allowing them in the consumer's payment profile(s).

Figure 1:
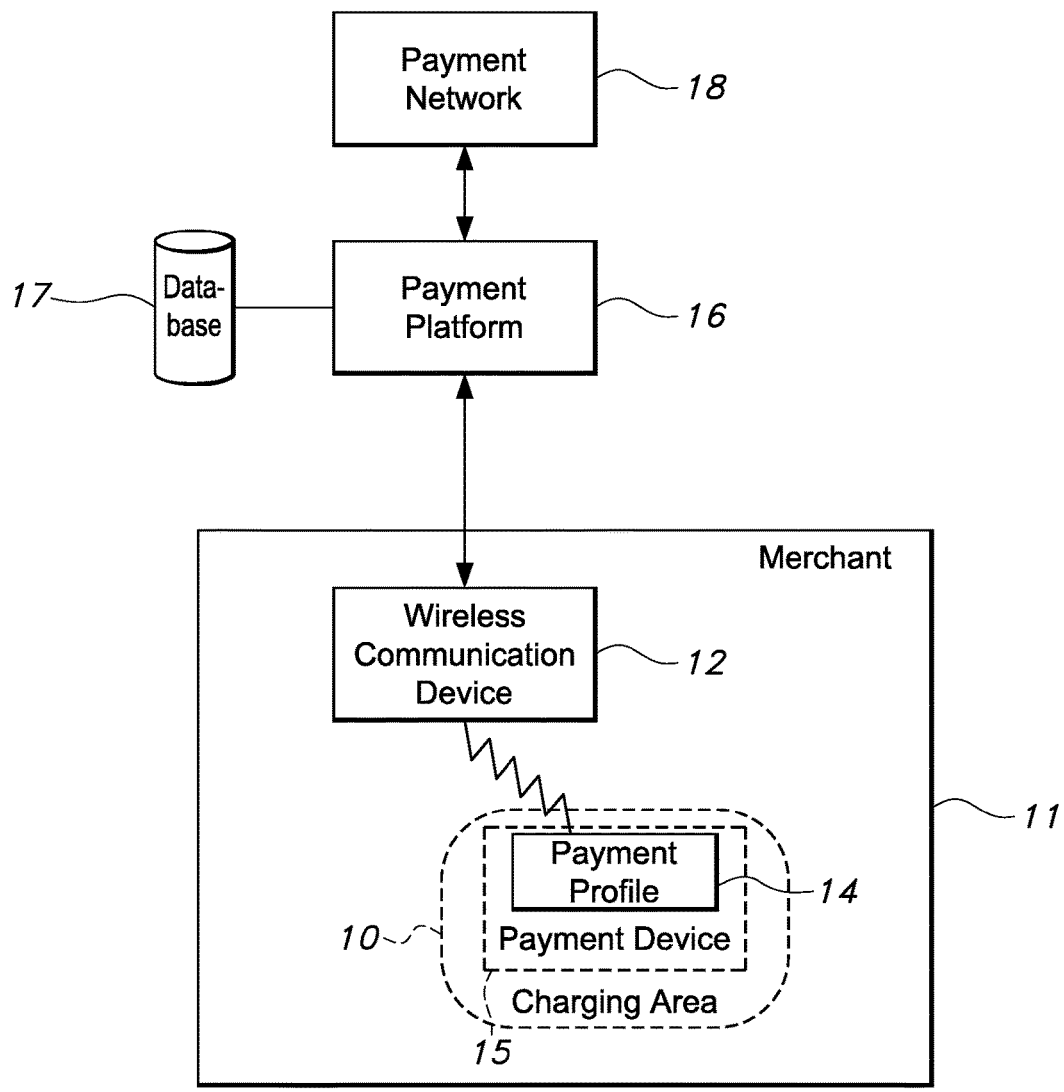
FIG. 1 is a schematic of the payment system of the present disclosure.

With reference to FIG. 1, the payment transaction may be initiated when a consumer with one or more payment profile(s) associated with them enters a payment charging area 10. A charging area 10 may be a physical location of a merchant 11 in which a consumer is typically charged to enter. For example, it may be a parking garage, museum, transit system, ground transportation, amusement park, etc. If a consumer enters these areas they intend to be charged. The charging area may include a wireless communication device 12. The communication device may be in the form of a scanner 12, which scans for a payment profile 14 carried by the purchaser entering or leaving the charging area 10. The payment profiles may be associated with and carried by a payment device 15. The payment device may be tag, fob, or any other device that is capable of carrying information that can be accessed wirelessly. The payment device 15 may be transported by the consumer or by a device such as a vehicle. The scanner 12 may be a near field or other wireless communication device. The payment device containing one or more payment profiles 14 may be of the type known in the art that can transmit or otherwise reveal information in response interrogation by the scanner 12. Accordingly, the scanner 12 can detect the payment profiles 14 associated with the payment device 15.

The scanner 12 may be operably connected to the payment platform 16. The scanner 12 is a detection tool that feeds the scanned information to a server that contains instructions how to process the information and send it to the payment platform. The payment platform 16 may include software and hardware, including memory servers, and the like, in communication with a payment network. The payment platform 16 may be administered by a payment platform provider. The payment platform 16 may also include, or be connected to, a database 17, including payment transactions history and information about the merchants and consumers. The payment platform 16 may maintain history information about past payment transactions in the database 17 and use it to make more accurate assessments about accepting the charge on behalf of the consumer. As further described below, this database 17 is used by the payment platform to verify payment transactions. The payment platform 16 may also be operably connected to a consumer's financial institution though which they may set up the payment profiles. Since a consumer is automatically being charged without a dedicated payment action, the payment platform 16 operates to ensure that the charges applied to the purchaser are legitimate and authorized. The payment platform is able to verify that the merchant and the consumer are correctly associated or matched and only legitimate charges are processed by the platform. Accordingly, the payment platform 16 operates to protect the purchaser against unauthorized charges.

The payment platform 16 is operably connected to payment network 18, such as the network operated by MasterCard international Incorporated, the assignee of the present disclosure. It is contemplated that the payment platform could be part of the payment network. Alternatively, the payment platform could be separate from the payment network and operably connected thereto. When a purchaser enters a charging area, the scanner scans for payment devices having encoded thereon an active payment profile. The payment profile 14 may be a database of identification information that allows the payment platform to verify the purchaser and authorize the payment. A profile may be a set of identification information and purchase control parameters. The purchaser may have only one payment profile or a plurality of payment identities or profiles and each payment profile may have a unique set of information associated therewith. Therefore, each payment profile may include different types of information and be used for different types of payment transactions. For example, one profile may be a vehicle profile. A vehicle profile may be used for payment transactions when expenses relating to a vehicle are incurred, such as a parking garage or car wash. A vehicle profile may include the name of the vehicle owner and vehicle VIN number, the size category of the vehicle. In addition, the vehicle profile may include control parameters.

The control parameters associated with a payment profile may be spending limit, geographical limitation, days and times when charges can be accepted, etc. For example an additional profile a consumer may have is a transit profile used for paying for mass transit. For a transit profile, a spending limit of $200 may be set since the transactions for commuting are anticipated to be less than the limit. Another control parameter may be limiting the types of merchants that can charge a fee. For example, a transit payment profile may be limited to travel related charges. If a charge for an electrical appliance is made under that profile, it would not be approved and accepted by the payment profile. By controlling such parameters as the transaction amount and merchant type, the payment profile helps to prohibit unauthorized uses.

Figure 2:
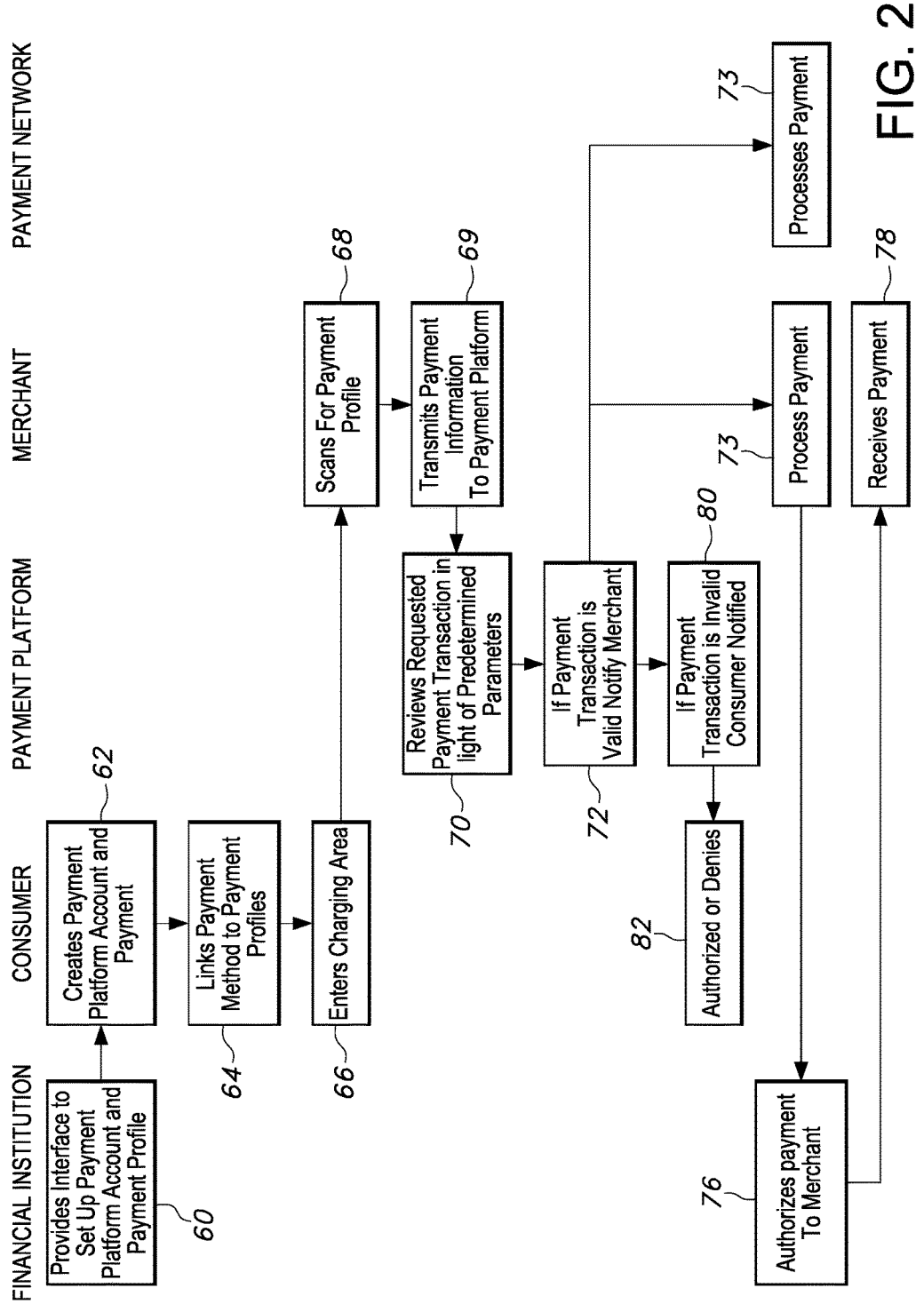
FIG. 2 is a relational flow chart of the payment system of FIG. 1.

With further reference to FIG. 2, a financial institution may provide an interface to allow a consumer to set up a payment profile account and one or more payment profiles 60. Alternatively, in order to set up a payment profile account, a consumer may interface with the payment platform provider directly or other payment entity with which they have a payment account, e.g., checking, credit, debit. In order to initiate the process, the consumer may create one or more payment profiles when setting up a payment platform account 62. This may be done over the internet by using a computing device connected to a website of the financial institution, and software running on the financial institution's server leads the consumer through a series of questions to assist in setting up one or more payment profiles the user chooses. When creating the payment profiles, the consumer may designate a payment method, e.g., credit card, debit card, digital wallet, etc., as the payment method for each profile. This information is accessible by the payment platform and used in the automatic payment process.

The payment profile information may be stored on the payment device itself. In this embodiment, when the payment device is scanned the information is provided. Alternatively, the payment profile information may be stored on the payment platform. In this embodiment, the device may have an identifier or token stored thereon, which is transmitted to the payment platform. The payment platform could then match the identifier with the payment profile and provide the information necessary to complete the verification and payment transaction. In a further alternative embodiment, the payment profile information may be stored by the user's financial institution. When the payment device is scanned the identifier is relayed to the payment platform, which then communicates with the financial institution over a network to receive the payment profile information.

When setting up the payment platform account, multiple payment profiles can be linked to payment methods by the consumer 64. In addition to personal payment profiles other types of payment profiles may be available, e.g., device profiles such as a car profile, boat profile, house profile, pet profile. The payment profile may be used by a person or a connected device/thing. For example, one person using the payment platform may have multiple payment profiles linked to their auto payment account such as a personal profile, visitor profile, transit profile, vehicle profile, and child's transit profile, etc. Each payment profile may have the same or different funding method associated therewith.

To ensure a user's privacy, each of the payment profiles may have only the information that is needed to complete the payment transactions. Therefore, information that is not required is not provided during the payment transaction. For example, if public transportation is being used and purchased, one piece of information to complete the transaction may be the purchaser's age since discounts may apply based on age. So for a transit payment profile, age of the user may be transmitted. Other transactions may provide pricing based on residence in a particular county or state, such as using a park or recreation area. In such situations, payment profiles dedicated to such transactions may include the consumer's place of residence.

When a consumer enters a merchant's charging area 66, the merchant scans for payment profiles 68. The merchant receiving the payment profile may only have access to the profiles they are able to use for a payment transaction. For example, a transit merchant may have access to consumers' transit profiles and only have access to other profile(s) if the consumer has specifically allowed such access. Otherwise these other payment profiles may be invisible to the merchant.

The merchant transmits the profile and other related payment transaction details to the payment platform 69. The payment profile is processed by the payment platform that reviews the transaction and permits the payment to proceed if it is verified in light of predetermined parameters 70. If the payment platform determines that the charge is legitimate, the platform will communicate 72 with the merchant or alternatively through the payment network, which will process the payment 73 to allow the payment to proceed. The financial institution authorized the payment 76 and the merchant is paid 78. If the payment platform finds the transaction to be invalid, the consumer may be notified 80, and the consumer can either override the payment platform and approve the charge, or deny the charge 82. If the consumer accepts the transaction, the payment process can proceed. In some embodiments, the payment platform could provide the consumer's payment information to the merchant. For example, the payment platform may send the payer's credit card number, expiration date, and shipping address to the merchant. The merchant may then process the payment similarly as if the user had keyed in the information in the web form. Alternatively, the payment platform could act as a facilitator and make the payment. For example, the merchant can send an account number and an electronic payment will be made. Alternatively, the merchant could send an "e-bill" that the payment platform pays using the dedicated payment method. Since the payment is being made automatically without a dedicated payment action on behalf of the consumer, the payment platform provides a protection to the consumer that the payment being requested by the merchant is legitimate.

In one embodiment, the payment platform 16 may include various methods to verify that the merchant and the consumer payment profile is correctly associated or matched and that only legitimate charges are processed by the payment platform. Verification of the association may include stored verification parameters, for example, determining if the merchant and/or consumer are registered in the system, reviewing prior charge history of the consumer and also prior charge history of all consumers and merchants using the platform, amount of the charge, time of the charge, frequency of the charge, location of the charge, location of the merchant, location of the consumer's payment profile, geo-fencing, allowed merchants, and use of secure identifiers for both merchants and consumers' payment profiles. In the context-aware Internet-of-Things environment, multiple data points can be collected to be merged and analyzed in the payment platform to be used in verification.

In addition to, or as part of, the verification process, the payment platform may cause a communication to be transmitted to the consumer if a control parameter is not met or if the transaction is otherwise not verified and authorized. For example, if a purchase exceeds a set amount, the payment platform can cause a notification to be issued to a consumer and provide the opportunity for the consumer to allow or deny the charge. The communication may be via a text message, social media, e-mail, a mobile application or other methods of contact known in the art. Manual verification triggered by a notification can also be done flexibly using a connected device and would not require stopping at a point of sale. For example, even if a user receives a notification to manually accept a charge they could accept it. e.g., while having lunch at the mall and the charge would be still handled automatically by the platform without requiring the user to stop at a specific location to complete the charge.

It is contemplated that the payment platform can be an extension to an existing digital wallet platform that already contains funding sources. In one embodiment, consumers can link their digital wallet, such as MasterPass[SM] (offered by MasterCard®) to a stand-alone automatic payment platform service.

Consumers can flexibly set default funding sources for different charges, pre-authorize charges and merchants, set pre-authorization limits and other preferences. The account may be managed online through mobile devices or other internet connected devices. Additional authorization requests sent to the user may be handled immediately in real time or all at once e.g., daily. The account stores receipts and transaction histories that may be viewed and accessed online. For example, a user could download or otherwise extract their transaction history and use it for bookkeeping purposes.

A merchant may scan a consumer's payment device, such as a tag for multiple payment profiles. A merchant may first scan for a transaction specific profile, for example a vehicle profile or transit profile. If no such profile is detected, the merchant may scan for a personal profile. For example, when taking the train or subway, the system would scan personal, transit, child and other applicable payment profiles. These profiles could be used in priority order from least personal, i.e., least amount of personal information, to more personal. The more personal profiles could also be restricted by the user requiring authorization before being available to a merchant. For example, a consumer may give a certain merchant, or certain types of merchants, access to a personal profile and restrict it from others. This gives consumers flexibility to use a plurality of profiles or set up more detailed set of profiles in order to accommodate privacy concerns. In addition, the payment platform may serve as the provider of the payment profile details. In this case, the payment profile may be a single identifier, e.g., a code or token, and the merchant may request additional profile details from the payment platform, e.g., to determine whether to charge a specific fee such as an adult or student fee.

The payment profile may include a variety of pieces of information that are provided by the consumer. The profile could be an account number only or it could, in addition, contain other details relevant to the profile, e.g., age or state/country etc. In one embodiment, the payment profile may be a code that is matched with an account by the payment platform. When a merchant is cleared by the payment platform to be making a legitimate charge, the payment platform can place or allow the charge to that account. The payment platform matches the payment profile with the consumer's account. A simple code token could be a very economical solution. However, the visible code would be backed-up with encryption and security algorithms between the scanners and the payment platform so that only the correct charges will be processed. The consumer may manage, disable, delete and renew such token codes at any time by accessing their account at the payment platform. In addition, one time codes could be used in cases where the token is presented by a connected device and the device could generate or receive a payment profile code to be used. One time code could be generated by an algorithm in a stand-alone token as well. The one time code could be recognized only at the payment platform that knows the algorithm used to generate the one-time code. Hence, it would be difficult to reproduce such personal randomly rotating codes and misuse could be avoided.

The payment devices may include embedded tags or features that carry the payment profile, e.g., radio frequency identification ("RFID"), Bluetooth tags, wireless personal area networking technology could be used that allow reasonably wide scanning area. Alternatively, connected devices can automatically connect to a merchant uniform resource identifier ("URI") to announce that they have entered the chargeable area. Alternatively, consumers may carry detectable identifications or connected tags/apps, e.g., embedded in their mobile devices or wearables (clothing, watches, jewelry) or other scannable devices. In order to be backward compatible, other existing methods may also be supported, e.g., cameras to read car license plate or consumer presenting a quick response ("QR") code or near field communication ("NFC") tap that transmits the payment profile. Connected devices can have their own payment profiles connected to the consumer's account in the payment platform. The payment profile is recognized by the merchant, e.g., by scanning the entry, exit or service area. This is done by using a suitable wireless or electronic technology.

Figure 3:
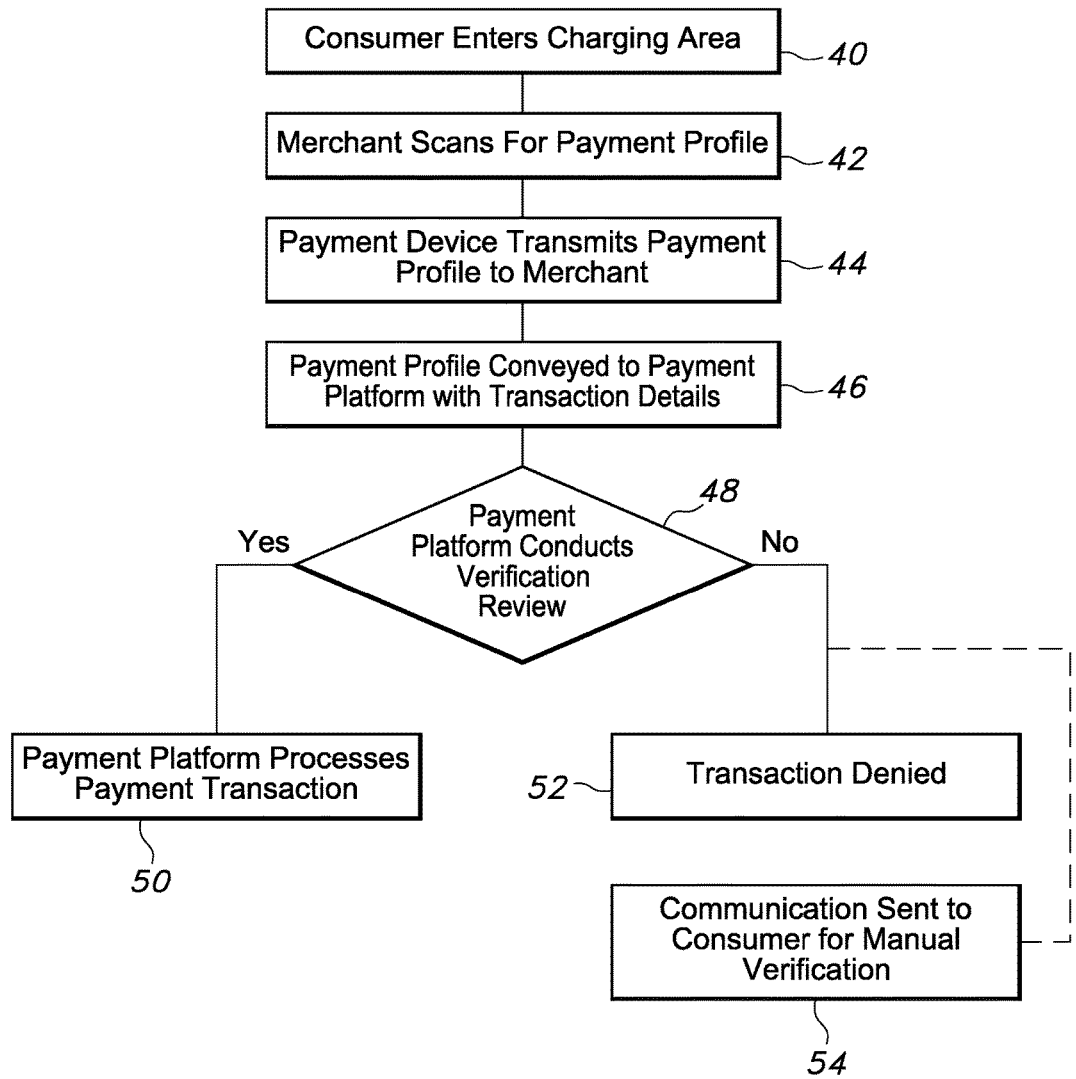
FIG. 3 is a flow chart of a payment transaction.
Figure 4:
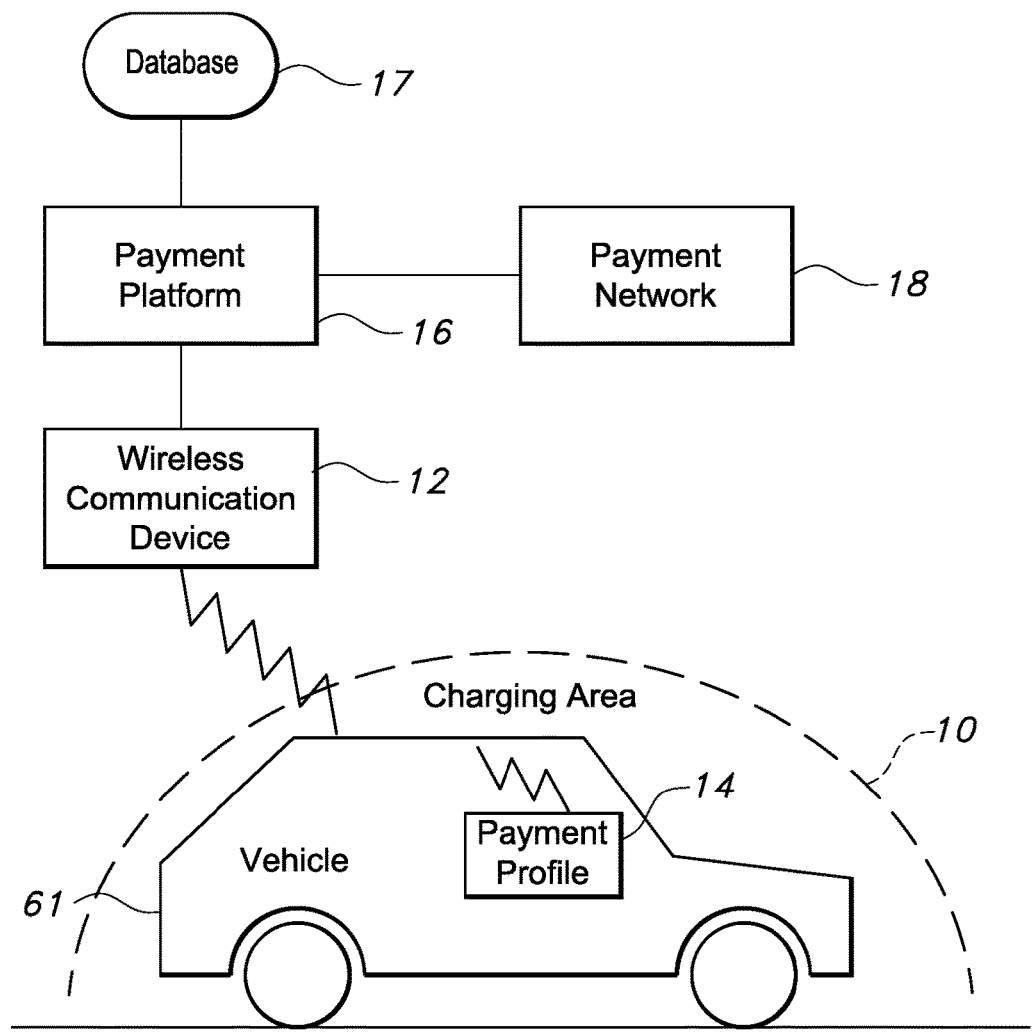
FIG. 4 is a schematic of a vehicle embodiment the payment system of the present disclosure.

With reference to FIGS. 3 and 4, an example of the operation of one embodiment of the system is as follows. When a consumer enters a parking garage 40 with a vehicle 61, its payment device or tag carrying the payment profile device is scanned by the sensors in the garage entry or parking place 42 or the vehicle connects to the merchant's URI to record its entry. In this example, the payment profile could be a device payment profile of the car or personal payment profile of the consumer. In priority order, the merchant could scan "vehicle" profiles first and use it if found. The payment profile is wirelessly conveyed to the merchant 44. The merchant then sends a verification query 46, including the information from the payment profile, to the payment platform to verify that the car's payment profile is linked to a payment method in the platform. The platform also verifies that the payment profile is correctly associated with the merchant to determine that it is a legitimate charge. The payment platform performs a review of the payment request and determines if the transaction is verified 48. If verified and accepted, the payment request may proceed via a payment network 50 when the merchant is ready to make the charge. When the car leaves the garage, the accumulated charge is sent to the payment method registered in the payment platform. If the transaction is not verified, then the transaction is denied 52. Alternatively, the payment platform may cause a communication to be sent to the consumer for manual verification 54. The consumer may then override the denial and accept the charge, or deny the transaction.

In addition, the consumer can pre-approve charges, e.g., up to a certain limit. So for example, if the parking charge is below $50, the consumer can simply drive in and out and the payment is conveniently processed on his/her behalf in the method described above. No dedicated payment action is required by the consumer; the payment is automatic and the user's experience is seamless and frictionless. If the charge exceeds the pre-approved amount, the payment platform may generate a communication to the consumer asking for approval of the transaction.

The payment profile, in addition to helping speed up payment transactions, can also provide other benefits to the merchant and consumer. Having exact statistics and knowledge of each user payment profile, the merchants can also automatically tailor charges, e.g., discounts for more frequent use, daily or monthly offers, special rates, premium services and offers. The payment platform provides such benefits as secure electronic payments for both merchants and consumers. Not having to handle cash provides convenience for the consumers when they utilize services using auto-pay without having to stop and pay. In addition consumers maintain the control over automatic charges and those requiring consumer's approval, so the payment platform is useful for both those wanting detailed visibility and those desiring more seamless experiences without payment notifications.

All of the above functions and methods can be implemented using computing systems, hardware, software and/or combinations thereof.

Figure 5:
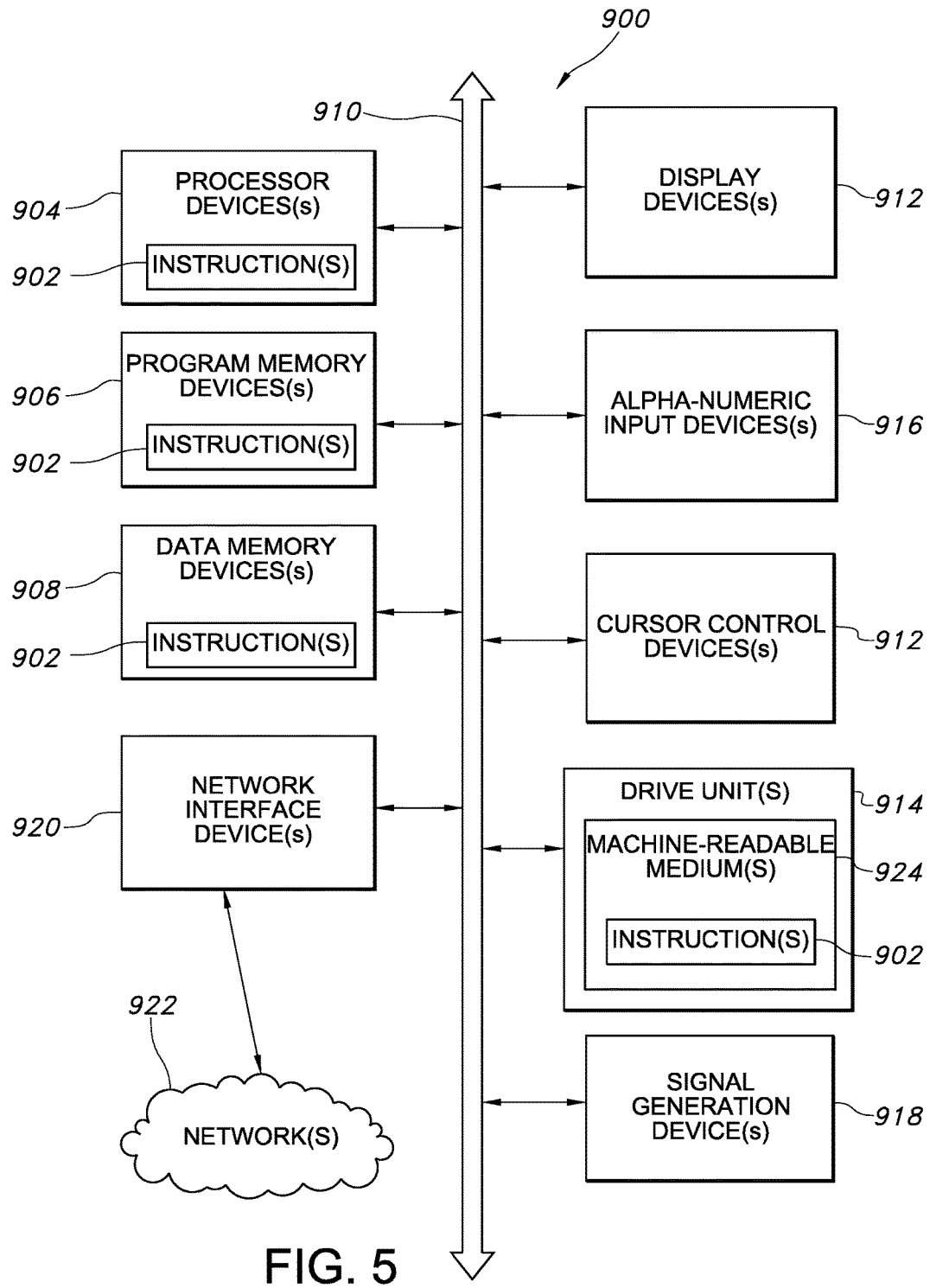
FIG. 5 is a block diagram of a computing system for implementing the payment system.

FIG. 5 is a block diagram of an embodiment of a machine in the form of a computing system 900, within which a set of instructions 902, when executed, may cause the machine to perform any one or more of the methodologies disclosed herein. In some embodiments, the machine operates as a standalone device. In some embodiments, the machine may be connected (e.g., using a network) to other machines. In a networked implementation, the machine may operate in the capacity of a server or a client user machine in a server-client user network environment. The machine may comprise a server computer, a client user computer, a personal computer (PC), a tablet PC, a Personal Digital Assistant (PDA), a cellular telephone, a mobile device, a palmtop computer, a laptop computer, a desktop computer, a communication device, a personal trusted device, a web appliance, a network router, a switch or bridge, or any machine capable of executing a set of instructions (sequential or otherwise) that specify actions to be taken by that machine.

The computing system 900 may include a processing device(s) 904 (e.g., a central processing unit (CPU), a graphics processing unit (GPU), or both), program memory device(s) 906, and data memory device(s) 908, which communicate with each other via a bus 910. The computing system 900 may further include display device(s) 912 (e.g., liquid crystals display (LCD), a flat panel, a solid state display, or a cathode ray tube (CRT)). The computing system 900 may include input device(s) 916 (e.g., a keyboard), cursor control device(s) 912 (e.g., a mouse), disk drive unit(s) 914, signal generation device(s) 918 (e.g., a speaker or remote control), and network interface device(s) 920.

The disk drive unit(s) 914 may include machine-readable medium(s) 924, on which is stored one or more sets of instructions 902 (e.g., software) embodying any one or more of the methodologies or functions disclosed herein, including those methods illustrated herein. The instructions 902 may also reside, completely or at least partially, within the program memory device(s) 906, the data memory device(s) 908, and/or within the processing device(s) 904 during execution thereof by the computing system 900. The program memory device(s) 906 and the processing device(s) 904 may also constitute machine-readable media. Dedicated hardware implementations, such as, but not limited to, application specific integrated circuits, programmable logic arrays, and other hardware devices can likewise be constructed to implement the methods described herein. Applications that may include the apparatus and systems of various embodiments broadly include a variety of electronic and computer systems. Some embodiments implement functions in two or more specific interconnected hardware modules or devices with related control and data signals communicated between and through the modules, or as portions of an application-specific integrated circuit. Thus, the example system is applicable to software, firmware, and hardware implementations.

In accordance with various embodiments of the present disclosure, the methods described herein are intended for operation as software programs running on a computer processor. Furthermore, software implementations can include, but are not limited to, distributed processing or component/object distributed processing, parallel processing, or virtual machine processing can also be constructed to implement the methods described herein.

The present embodiment contemplates a machine-readable medium or computer-readable medium containing instructions 902, or that which receives and executes instructions 902 from a propagated signal so that a device connected to a network environment 922 can send or receive voice, video or data, and to communicate over the network 922 using the instructions 902. The instructions 902 may further be transmitted or received over a network 922 via the network interface device(s) 920. The machine-readable medium may also contain a data structure for storing data useful in providing a functional relationship between the data and a machine or computer in an illustrative embodiment of the disclosed systems and methods.

While the machine-readable medium 924 is shown in an example embodiment to be a single medium, the term "machine-readable medium" should be taken to include a single medium or multiple media (e.g., a centralized or distributed database, and/or associated caches and servers) that store the one or more sets of instructions. The term "machine-readable medium" shall also be taken to include any medium that is capable of storing, encoding, or carrying a set of instructions for execution by the machine and that cause the machine to perform anyone or more of the methodologies of the present embodiment. The term "machine-readable medium" shall accordingly be taken to include, but not be limited to: solid-state memories such as a memory card or other package that houses one or more read-only (non-volatile) memories; random access memories, or other re-writable (volatile) memories; magneto-optical or optical medium such as a disk or tape; and/or a digital file attachment to e-mail or other self-contained information archive or set of archives considered to be a distribution medium equivalent to a tangible storage medium. Accordingly, the embodiment is considered to include anyone or more of a tangible machine-readable medium or a tangible distribution medium, as listed herein and including art-recognized equivalents and successor media, in which the software implementations herein are stored.

Although the present specification describes components and functions implemented in the embodiments with reference to particular standards and protocols, the disclosed embodiment are not limited to such standards and protocols.

The illustrations of embodiments described herein are intended to provide a general understanding of the structure of various embodiments, and they are not intended to serve as a complete description of all the elements and features of apparatus and systems that might make use of the structures described herein. Many other embodiments will be apparent to those of skill in the art upon reviewing the above description. Other embodiments may be utilized and derived there from, such that structural and logical substitutions and changes may be made without departing from the scope of this disclosure. Figures are also merely representational and may not be drawn to scale. Certain proportions thereof may be exaggerated, while others may be minimized. Accordingly, the specification and drawings are to be regarded in an illustrative rather than a restrictive sense.

While preferred embodiments of the present disclosure have been described herein, it is expressly noted that the present disclosure is not limited to these embodiments, but rather the intention is that additions and modifications to what is expressly described herein also are included within the scope of the disclosure. Moreover, it is to be understood that the features of the various embodiments described herein are not mutually exclusive and can exist in various combinations and permutations, even if such combinations or permutations are not made express herein, without departing from the spirit and scope of the disclosure.

What is claimed is:

1. A method of conducting a payment transaction initiated by a merchant in response to detecting the presence of consumer payment devices in a payment charging area, the method comprising:

scanning, using a merchant wireless communication device, the payment charging area for payment profiles associated with and located on the consumer payment devices in the payment charging area, the consumer payment devices being configured to respond to interrogation by the merchant wireless communication device;

receiving, by a payment platform, a verification query including i. information based on a first of the payment profiles acquired by the merchant wireless communication device and ii. a payment request including merchant information;

comparing, by the payment platform, the information based on the first payment profile and the merchant information with consumer-defined verification parameters to determine if the first payment profile is associated with the merchant information for the payment request; and verifying, by the payment platform, the payment transaction between the first payment profile and the merchant in response to determining that the first payment profile is associated with the merchant information for the payment request.

2. The method as defined in claim 1 further comprising, denying, by the payment platform, the payment request in response to determining that the first payment profile is not associated with the merchant information for the payment request.

3. The method as defined in claim 1, wherein the first payment profile includes an account number.

4. The method as defined in claim 1, wherein the first payment profile includes information relevant to the payment request.

5. The method as defined in claim 1, wherein a first of the consumer payment devices has a plurality of payment profiles associated therewith.

6. The method as defined in claim 5, wherein at least one of the plurality of payment profiles is related to a type of transaction.

7. The method as defined in claim 5, wherein at least one of the plurality of payment profiles is a personal profile including information specific to a payee or a payee type.

8. The method as defined in claim 5, wherein the wireless communication device scans the first consumer payment device for the presence of payment profiles in a predetermined order.

9. The method as defined in claim 8, wherein the predetermined order includes first scanning for a payment profile specific to the type of transaction in the payment request, and if a suitable profile is found scanning ceases.

10. The method as defined in claim 9, wherein if a payment profile specific to the type of transaction in the payment request is not located, the scanning device scans for an alternative payment profile.

11. The method as defined in claim 1, wherein the first payment profile includes information required to determine pricing.

12. The method as defined in claim 1, wherein a consumer controls access to the first payment profile by the wireless communication device.

13. The method as defined in claim 1, wherein the verification by the payment platform includes determining if a prior transaction has occurred between the first payment profile and the merchant.

14. The method as defined in claim 1, wherein the verification by the payment platform includes determining if the first payment profile is registered with the payment platform.

15. The method as defined in claim 1, wherein the verification by the payment platform includes reviewing the time and location of the payment request.

16. The method as defined in claim 1, wherein upon verification of the payment transaction, the payment platform processes the payment transaction by transmitting payment details over a payment network.

17. A payment authorization system for authorizing a payment transaction initiated by a merchant in response to detecting the presence of consumer payment devices in a payment charging area, the payment authorization system comprising:

a merchant wireless communication device configured to scan the payment charging area for payment profiles associated with and located on the consumer payment devices in the payment charging area, the consumer payment devices being configured to respond to interrogation by the merchant wireless communication device;

a first payment profile and a second payment profile associated with a first of the consumer payment devices, the first payment profile containing information different from the second payment profile, the first payment profile being related to a first payment activity, the second payment profile being related to a second payment activity;

a payment platform operably connectable to the merchant wireless communication device and having a processor operable by instructions to:

receive i. information based on at least one of the first and second payment profiles acquired by the merchant wireless communication device from the first consumer payment device and ii. a payment request including merchant information;

compare the information based on at least one of the first and second payment profiles and the merchant information with consumer-defined verification parameters to determine if the information based on at least one of the first and second payment profiles is associated with the merchant information for the payment request; and verify that the payment transaction in response determining that the information based on at least one of the first and second payment profiles is associated with the merchant information.

18. The system as defined in claim 17, wherein the first payment profile includes information specific to a type of payment transaction.

19. The system as defined in claim 17, wherein the payment platform accesses a database to determine if the first consumer payment device had previously made a payment transaction with the merchant.

20. A payment transaction system for authorizing a payment transaction initiated by a merchant in response to a merchant wireless communication device detecting the presence of consumer payment devices in a payment charging area, the payment transaction system comprising:

a merchant wireless communication device configured to scan the payment charging area for payment profiles associated with and located on the consumer payment devices in the payment charging area, the consumer payment devices being configured to respond to interrogation by the merchant wireless communication device;

a plurality of payment profiles;

a payment platform including a processing device in communication with the merchant wireless communication device, the payment platform processing device being operable by instructions to:

receive a verification query including i. information based on a first of the payment profiles acquired by the merchant wireless communication device and ii. a payment request including merchant information;

compare the information based on the first payment profile and the merchant information with consumer-defined verification parameters to determine if the first payment profile is associated with the merchant information for the payment request; and verify the payment transaction between the first payment profile and the merchant in response to determining that the first payment profile is associated with the merchant information for the payment request.

21. The system as defined in claim 20, wherein a second of the payment profiles includes different information than the first payment profile, and the first payment profile being used to conduct a first type of payment transaction and the second profile being used to conduct a second type of payment transaction.

22. The system as defined in claim 20, wherein the first payment profile is stored by one of the payment platform, the consumer payment device, and a financial institution.

23. The system as defined in claim 20, wherein the first payment profile is stored by one of the payment platform and a financial institution, and wherein the system further comprises a token on the consumer payment device.

24. The system as defined in claim 20, wherein the payment platform is operably connectable to a financial institution.

25. The system as defined in claim 20, wherein the payment platform is operably connectable to a payment network.

26. The system as defined in claim 20, wherein the payment platform is part of a payment network.

* * * * *